Sept. 20, 1966  N. O. ROSAEN  3,273,715
FLUID FILTERS

Filed April 27, 1962  4 Sheets-Sheet 1

Fig. 1

INVENTOR
NILS O. ROSAEN

BY Hutchinson & Milans
ATTORNEYS

Sept. 20, 1966 N. O. ROSAEN 3,273,715
FLUID FILTERS

Filed April 27, 1962 4 Sheets-Sheet 2

INVENTOR
NILS O. ROSAEN

BY Hutchinson & Milans
ATTORNEYS

United States Patent Office 3,273,715
Patented Sept. 20, 1966

3,273,715
FLUID FILTERS
Nils O. Rosaen, Bloomfield Hills, Mich., assignor to The Rosaen Filter Company, Hazel Park, Mich., a corporation of Michigan
Filed Apr. 27, 1962, Ser. No. 190,764
27 Claims. (Cl. 210—90)

This invention relates to fluid filters of the type used for filtering circulating fluids, such as oil, as commonly used in many hydraulically actuated systems and in particular it relates to improvements in fluid filters of the type embodying an axially movable or slidable filter cartridge having indicating means associated therewith which means is responsive to the movement of the cartridge to indicate the condition of the filter element.

Fluid filters of the general type to which the present invention relates are shown and claimed in copending applications of Oscar E. Rosaen and Nils O. Rosaen Serial 649,059, filed March 28, 1957, and now Patent No. 3,053,389 and Serial No. 26,046, filed May 2, 1960 and now banadoned in favor of a continuation-in-part application Serial No. 331,640, filed December 11, 1963. This invention is directed to novel improvements over these prior structures as disclosed in said applications.

Fluid filters of this type are used in many hydraulically actuated systems to remove dirt, grit and the like foreign matter from the fluid of the system to prevent much matter from fouling the pump, valves and the other intricate parts of the hydraulic system. Such systems generally employ a fluid pump drawing oil from a source of supply and delivering the same under pressure throughout the fluid system for operation of suitable component parts thereof, after which the fluid is returned to the source of supply to be recirculated by the pump. Filters are preferably installed in such systems between the source of supply and the intake to the pump and when so installed are generally referred to as suction filters. In other instances filters may be installed in the return line to the source of supply and when so installed are generally referred to as return line filters.

In systems of this character it is necessary to periodically check the condition of the filter and to replace the filter cartridge or clean the same in order to provide an efficient filtering system for the circulating fluid. The indicating mechanism provided by the filters of this type clearly forewarns the operator so that change of the filter cartridge can be made at the proper time when the unit has become dirty and prior to any actual by-passing of the filter element.

In many types of installations the reservoir for the fluid of the system may necessarily be located in the installation so that the head of fluid therein is at a higher level or elevation than the location of the filter unit. Furthermore, the filter may be actually submerged in the reservoir, near the bottom thereof. In such installations whenever change of the filter cartridge is necessary, difficulty has been experienced in making this change. It has been necessary to shut down the pump and thus render the system inoperative and to thereafter drain the fluid from the reservoir, at least to the point of elevation of the filter unit, before the filter cartridge could be removed. Failure to first drain the fluid from the reservoir would result in the fluid spilling out through the filter housing when it was opened for removal of the cartridge resulting in loss of the fluid of the system and necessitating a difficult clean-up operation.

However, shutting down the system and first draining the reservoir before changing the cartridge is a time-consuming process which puts the system out of operation for a considerable period of time, seriously hampering production of the plant.

It is therefore the object of the present invention to overcome this disadvantage by providing novel means in a filter for effectively closing the inlet from the reservoir to the filter housing so that the filter cartridge can be quickly and efficiently changed or cleaned without loss of the fluid of the reservoir or without first draining the reservoir prior to change of the cartridge.

Another object of the invention is to provide a novel fluid filter construction of the axially movable cartridge type having check valve means associated therewith which will shut off the flow of incoming fluid to the filter cartridge chamber whenever the cartridge is removed from the chamber.

Another object is to provide a fluid filter unit of simple construction employing few additional parts, with the check valve means utilizing the same biasing means that is employed for holding the cartridge against axial movement.

A further object of one form of the invention is to provide a filter unit of novel structure including a check valve means for shutting off the incoming fluid from flowing to the cartridge chamber on removal of the cartridge, without the necessity of shutting down the hydraulic system, thereby permitting the cartridges to be changed while the system is maintained in continuous operation.

Another object of the invention is to provide a fluid filter having novel means to indicate and signal the clogging of the filter cartridge before it reaches an undersirable extent, which means is conveniently and compactly associated with and carried by the closure plate for the filter housing.

Other and further objects and advantages of the present invention will become apparent from the following description and appended claims, reference being had to the accompanying drawing forming a part of this specification. The invention may be embodied in the forms illustrated in the drawings, attention being called to the fact, however, that the drawings are illustrative only, and that changes may be made in the specific constructions illustrated described, so long as the scope of the appended claims is not violated.

In the accompanying drawings which form a part of this application.

Like characters of reference are used throughout the following specification and the accompanying drawings to designate corresponding parts.

The present fluid filter, as heretofore mentioned, is similar in certain basic aspects to the oil filters shown and claimed in copending prior applications Serial Nos. 649,059, now Patent No. 3,053,389, and 26,046, but differs from the structures there shown in the arrangement of the means for indicating movement of the filter cartridge in the housing, as well as in the novel arrangement of parts which effectively block the flow of fluid from the reservoir or fluid supply to the cartridge chamber.

Figure 1:
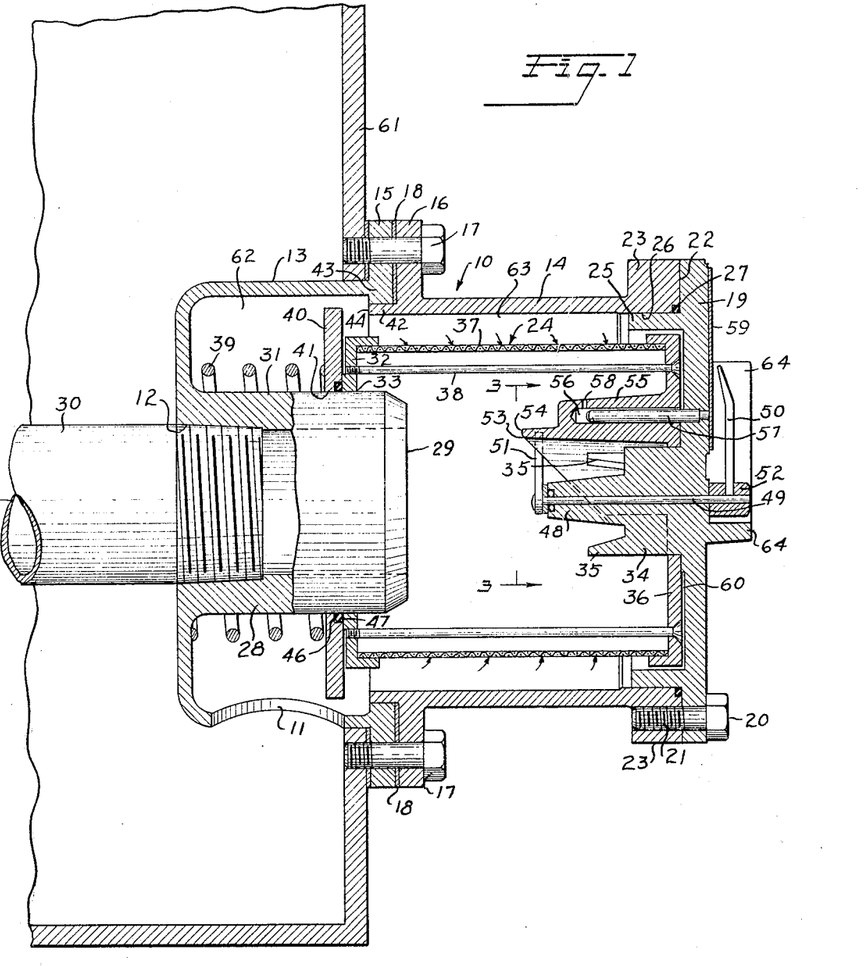
FIGURE 1 is a longitudinal sectional view through the axially movable cartridge fluid filter showing one embodiment of the invention with the unit mounted near the bottom of the fluid reservoir.
Figures 4, 5:
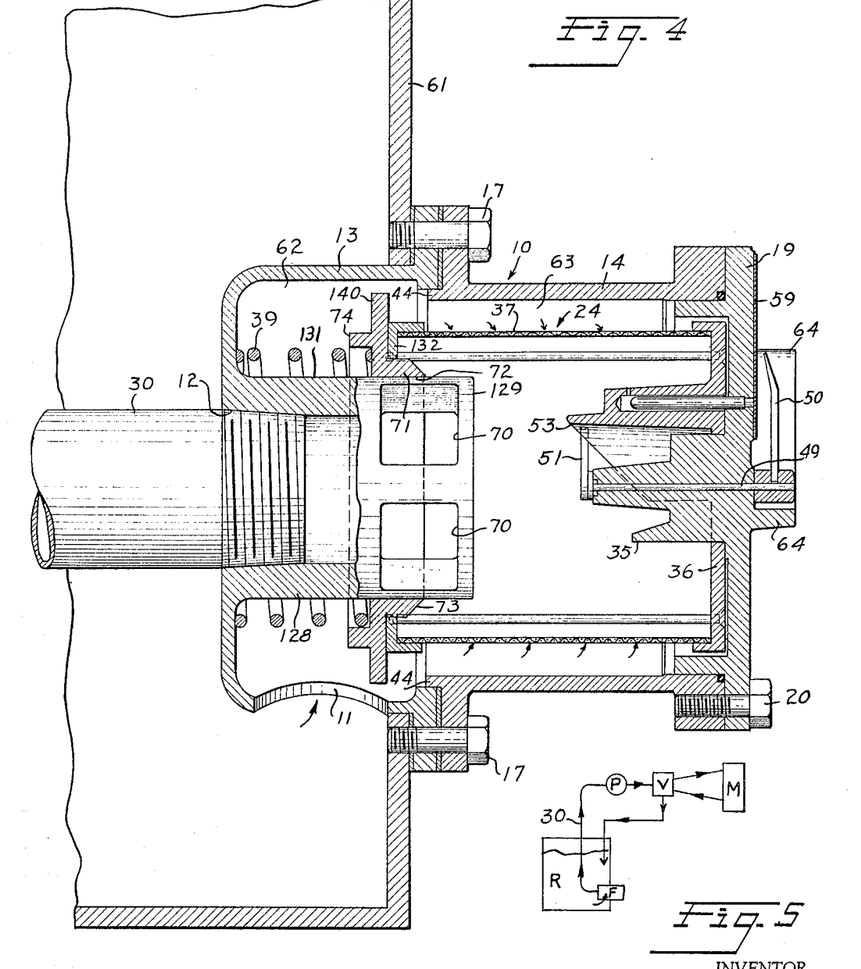
FIGURE 4 is a longitudinal sectional view through an axially movable cartridge fluid filter showing a second embodiment of the invention with the unit mounted on a fluid reservoir.
FIGURE 5 is a diagrammatic showing of one hydraulic installation in which the filter units of FIGURES 1 and 4 can be used.

Filters of the type shown in the FIG. 1 and FIG. 4 embodiments are commonly referred to as "suction filters," since they are installed in the system on the suction or intake side of the pump, with the outlet of the filter unit connected to the intake of the pump and the inlet of the filter unit connected to the fluid reservoir or supply of the hydraulic system. When the pump is in operation, fluid is drawn from the supply through the filter unit to the pump which in turn delivers the fluid under pressure to the system for actuation of the components thereof, after which the fluid is returned to the reservoir or supply for recirculation. FIG. 5 of the drawings diagrammatically illustrates such a system with the filter unit F mounted on the reservoir R. Fluid from said reservoir after passing through the filter is conducted by pipe 30 to the pump P which feeds the fluid under pressure to the servo-valve mechanism V which controls the flow to the hydraulic motor M of the hydraulically operated mechanism. From the servo-valve mechanism the fluid is returned to the reservoir R as shown. The arrow heads indicate the direction of fluid flow.

In the various embodiments shown in the drawings and described below, the filters are shown as so-called "submerged" type filters, that is, they are mounted on the reservoir for the fluid supply of the system with at least part of the filter (the intake thereof) extending into the reservoir, preferably near the bottom of the tank. It will be understood that the filters of this invention operate as efficiently in any other installation and do not have to be mounted as shown, but are of greatest utility in installations where the filter is mounted at a lower elevation than the head of fluid in the reservoir.

Referring to FIG. 1 of the drawing, there is shown a fluid filter of the axially movable cartridge type of the general character embodied in the above-mentioned patent applications which comprises a generally cylindrical housing 10 provided near one end with a fluid inlet 11 and at the same end provided with an axially arranged outlet 12. The housing 10 is preferably formed of two castings 13 and 14, for convenience in machining and assembly, provided with flanges 15 and 16 suitably secured together by bolts 17 passing through registering openings in the mating flanges with suitable sealing gaskets 18 interposed between the abutting flanges.

The right hand end of the housing part 14 is securely closed by a cover or closure plate 19 removably secured to the housing by a plurality of suitable bolts 20 passing through openings in the plate and threadedly received in threaded openings 21 formed in the abutting face 22 of a flanged end 23 of the housing part 14. The closure plate on removal from the housing affords access to the interior of said housing for the removal and insertion of the filter cartridge generally indicated by the reference character 24.

The closure plate 19 is provided with an inwardly extending flange or collar 25 which is machined to slidingly and snugly fit on its outer face the cylindrical inner surface 26 of the opening in the housing part 14. The flanged end 23 of the part 14 is recessed at 27 for the reception of a suitable sealing O-ring between the parts to afford an effective sealing closure.

The left hand part 13 of the housing 10 is formed with an inwardly, axially extending tubular member 28 terminating just short of the midpoint of the housing and open at that inner end 29 so as to create the axially disposed tubular outlet 12, said outlet being threaded at the outer end for the reception of a tubular conduit 30 leading to the intake of the pump (not shown) of the hydraulic system.

The external surface 31 of the tubular extension 28 is finished to provide a smooth cylindrical surface for the reception of a cooperating flanged end cap 32 provided with a central recess 33 finished to nicely fit the external surface of the tubular extension for slidable engagement therewith.

Closure plate 19 is provided on its inner face with an inwardly extending cylindrical boss 34 centrally positioned on the plate and coaxially disposed with reference to the tubular extension 28 but of a diameter considerably less than that of the extension 28 as clearly shown. Boss 34 terminates in spaced tongues 35 for a purpose to be hereinafter described. The cylindrical exterior surface of the boss 34 serves as a guide for the flanged cap or ring 36 of the filter cartridge 24, the cooperating surfaces of the two members being nicely finished as in the case of the cooperating surfaces between the cap 32 and the tubular extension 28.

A cylindrical screen, or any suitable filtering element, 37 is carried between its two end caps, 32 and 36, and the screen and caps are suitably secured together in any desired fashion, such as by means of bolts 38 passing through cap 36 and threaded into cap 32, as shown, to form a unitary assembly. The assembly of filtering element and its two end caps thus constitutes the filter cartridge as it is referred to in the art.

As is customary in fluid filters of this type, the filter cartridge 24 is normally maintained in the position shown in FIG. 1 with the cap 36 bearing against the inner face of the closure plate 19 with the cap at the base of the boss 34, by means of a coil spring 39 applying a resilient force against the left-hand end cap 32. The structure in this respect differs from the prior applications in that a check plate 40 provided with an aperture 41 whose internal surface is finished to provide a sliding fit with the outer surface of the tubular member 31, is mounted adjacent to end cap 32, as shown, and the spring 39 is disposed about the tubular member 31 being seated at one end against the outer face of the check plate 40 and at the other end against the inner face of the end wall of the housing part 13.

The housing part 14 terminates at its inner, left-hand end in an extension 42 which is disposed within the cooperating part 43 of the housing part 13, to provide a seating face 44 for the check plate 40. The cartridge 24 is selected to have a length, when properly inserted within the housing as shown in FIG. 1, sufficient to securely seat cap 32 on the tubular extension 28 with the check plate 40 adequately spaced from the seating face 44 to permit flow of the incoming fluid to pass around the edge of plate 40 and pass face 44 into the housing part 14 externally of the filter element 37.

The plate 40 is preferably provided with an annular groove 46 on the side abutting the end cap for the reception of a suitable sealing ring 47. While the internal diameters of the openings in the plate 40 and cap 32 closely fit the tubular member 28 they are nevertheless freely slidable thereon.

The spring 39 is selected of a strength sufficient to retain the filter cartridge, when the filter element is clean, in the extreme right-hand position of the housing, as shown in FIG. 1. The spring selection will, of course, be based upon the rating of the pump of the particular system in which the filter unit is installed, consideration being given to the desired permissible pressure drop between the inlet 11 and the outlet 12 of the filter when the pump and system are in operation.

Furthermore, this same spring 39 now performs a double function since it will be adequate to urge the check plate 40 into seating engagement with the seat 44 whenever the closure plate 19 is removed for the removal and change of the filter cartridge. The novel arrangement of elements now permits a single spring to be used for control of the movement of the cartridge and for urging the check plate towards closed position. With the cartridge removed from the housing and the plate 40 held against the sealing seat 44 the inlet flow will be completely blocked from entering the filter cartridge chamber in housing part 14. It should here be noted that the inwardly directed flange or collar 25 of the closure plate 19 is of greater length than the distance between the separated contacting areas of the check plate 40 and its seat 44 when the cartridge is in place as shown in FIG. 1. This insures that the check plate 40 will seat on its sealing face 44 before the filter chamber is fully opened to the atmosphere on removal of the closure plate, thus blocking the flow of fluid from the inlet entering the filter cartridge chamber.

While the indicating means employed basically comprises a rotary hand mounted on a shaft extending through the housing and carrying an arm on its inner end which arm is moved by a cam means carried by the end cap 36, the arrangement of parts is quite different from the indicating means of the prior noted applications. In the present embodiments, the indicating means is carried entirely by the closure plate 19 and is completely removed from the housing on removal of the closure plate.

Centrally disposed and extending from the exterior through an axial opening in the closure plate, the boss 34 and a conical extension 48 of said boss is shaft 49 having mounted on its exterior end an indicator hand 50 and on its inner end an actuating arm 51. The inner end of the conical extension 48 is provided with a groove about the shaft opening for the reception of an O-ring seal. Both the hand and arm are fixed to the shaft 49 in any manner for rotatable movement therewith about the axis of the shaft. The hand 50 is preferably mounted in a collar 52 slipped over the end of the shaft and adjustably secured thereto by means of a suitable set screw, not shown, while the arm 51 may be securely welded to the inner end of the shaft.

Figure 3:
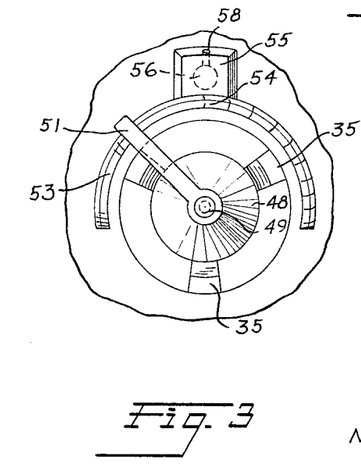
FIGURE 3 is a fragmentary elevational view of parts of the interior surface of the closure plate and the interior of the cartridge cap carrying the cam shell as viewed from the line 3—3 of FIGURE 1.

The inner face of the flanged end cap 36 is provided with an integrally formed inwardly extending semi-circularly disposed, cam ridge 53, forming in effect a hood-like extension which projects toward the opposite end of the cartridge chamber over but spaced from the boss 34 when the cartridge is in place in the housing. As will be noted from FIG. 1 and FIG. 3 of the drawings the cam ridge 53 has its high point at 54 midway of the ridge with the ridge gradually tapering off on both sides of the high point, as shown. The end cap 36 also has an integrally formed enlargement 55 above the cam ridge which is axially drilled at 56 from the outer face to receive a dowel pin 57 carried by the inner face of the closure plate for the purpose of keeping the cartridge and closure plate in proper rotational relationship so that the indicating mechanism and cam surface will be in the correct relative position to each other. The drilled opening 56 may be provided with a small passageway 58 to relieve any back pressure from developing when the dowel pin is inserted in the opening 56, in the event the opening is not drilled completely through the enlargement 55.

In lieu of the drilled opening 56 in the enlargement 55, the flange of the end cap 36 may be provided with a groove in its periphery to receive a dowel pin carried by the closure plate opposite said groove.

Figure 2:
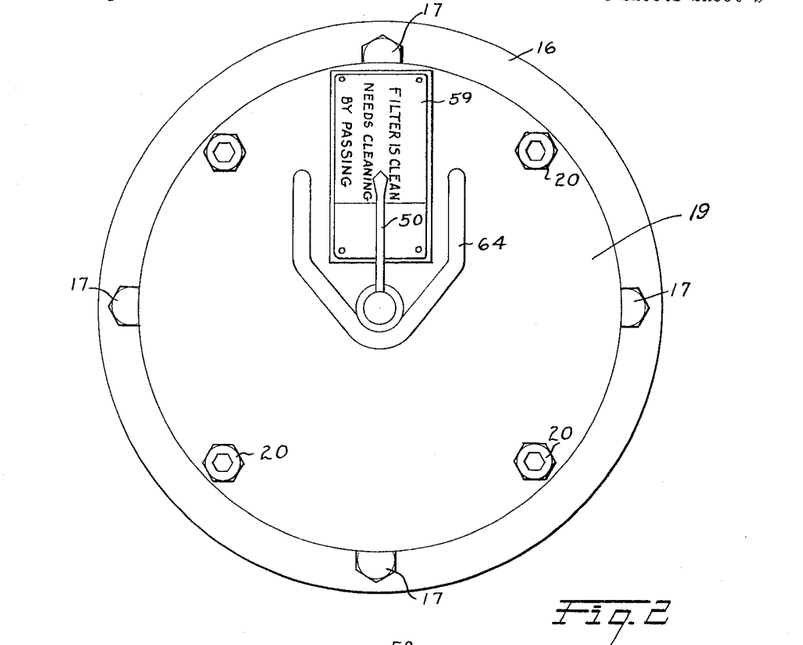
FIGURE 2 is an end elevational view of the closure plate as viewed from the right end of FIGURE 1.

The exterior face of the closure plate 19 is provided with a suitable legend plate 59 associated with the indicator hand 50. As shown in FIG. 2, the legend plate preferably contains such indicia as "FILTER IS CLEAN," "NEEDS CLEANING" and "BYPASSING." The indicator hand 50 is adjusted on the shaft 49 with reference to the actuating arm 51, so that the indicator hand points to the "FILTER IS CLEAN" position when the actuating arm is bearing against the cam ridge 53 when the cartridge is in the position shown in FIG. 1 with the end cap 36 against the closure plate.

The inner face of the closure plate may be machined somewhat as shown to provide a minute clearance 60 between the abutting faces of the end cap 36 and said plate, or these surfaces may be left somewhat roughened so that the incoming fluid will always enter therebetween.

The filter unit 10 is shown mounted on the side of the fluid reservoir 61 with the housing part 13 extending through an aperture cut in the reservoir wall. Bolts 17 may secure the unit to the wall as shown. Inlet 11 is open to the fluid of the reservoir and outlet 12 is connected to a pipe 30 which leads to the intake of the pump of the hydraulic system.

With the cartridge in place as shown in FIG. 1 and the indicating mechanism properly adjusted as heretofore recited, the unit operates in the following manner. When the pump is started fluid will be drawn into the unit from the reservoir through the inlet 11 and will pass around the peripheral edge of the check plate 40 and pass seating face 44 filling the chamber surrounding the cartridge 24. The fluid will normally be drawn through the filter screen 37 to the interior of the cartridge from whence the filtered fluid flows out of the housing by passing through the tubular extension 28 to the pipe 30 which carries the fluid to the pump inlet as stated. As long as the screen is relatively clean spring 39 will maintain the cartridge in the position shown in FIG. 1 with the indicator hand in the "FILTER IS CLEAN" position.

It will be appreciated that in normal operation the fluid will fill the inlet chamber 62 and the cartridge chamber 63 outside of the screen 37 and at the same time fluid will enter between the abutting faces of the end cap 36 and the closure plate 19, but fluid will not pass between the closely fitting surfaces defining the opening in the end cap 36 and the boss 34 as well as the closely fitting surfaces defining the opening in the end cap 32 and the tubular extension 28. However, as heretofore mentioned, the selected spring 39 will prevent the cartridge from moving to the left away from the face of the closure plate under normal operating conditions while the cartridge screen is clean.

When the screen 37 of the cartridge begins to become clogged with filtered dirt from the fluid, the pressure differential between the inlet and the outlet of the filter unit will rise and the pressure drop across the filter cartridge will increase until this pressure difference rises above the selected or predetermined permissible pressure drop as determined by the rating of the selected spring 39. When the pressure drop across the filter unit exceeds the spring force, the filter cartridge asssembly will begin to move to the left as viewed in FIG. 1 against the resistance of the spring and away from the closure plate 19. The cartridge moves farther and farther to the left as the differential pressure increases due to clogging of the filter until the opening in the end cap 36 clears the main body of the boss 34 and exposes the openings between the spaced extensions or tongues 35 to the incoming fluid which will then flow directly to the interior of the filter cartridge through these spaces, thus by-passing the screen 37.

It will be apparent that movement of the filter cartridge assembly to the left due to increase in pressure differential does not uncover any additional areas to pressure forces, since end cap 32 is at all times piloted on the exterior cylindrical surface 31 of the tubular extension and end cap 36 is at all times piloted on the guide boss 34. The moving force for the cartridge is the difference in the hole diameters of the two end caps giving a greater operating area on the cap 36 for the pressure forces to effect movement of the cartridge to the left. Operating pressure differential occurs mainly between the inner and outer faces of the end cap 36 and hence the filter cartridge functions as a true piston, as opposed to conventional poppet valve devices. Consequently the cartridge assembly will, after it starts to move, tend to assume a position where spring pressure is balanced by fluid pressure forces. The greater the fluid pressure differential caused by clogging of the screen, the greater the compression of the spring. The degree of movement of the filter cartridge toward the by-pass position is thus a linear function of pressure drop across the filter screen.

As the cartridge moves to the left, check plate 40 will likewise be moved to the left in view of the abutting relationship between the end cap 32 and that plate as heretofore described and on return movement to the right the plate will follow the end cap due to the disposition of spring 39. When the operator desires to change the filter cartridge the closure plate is axially removed after removal of the retaining bolts 20. Spring 39 will force check plate 40 to follow the withdrawing movement of end cap 32 to the right as the cartridge is removed until plate 40 seats against the seating face 44 of housing part 14 which then seals off the cartridge chamber 63 from the inlet chamber 62. As heretofore explained the check plate seats on the face before the closure plate is entirely removed and hence there is no danger of the incoming fluid being permitted to enter the open cartridge chamber and consequently no need to first drain the reservoir before the cartridge is removed.

When the filter cartridge moves toward the left-hand end of the housing in response to differential pressure increases as progressive clogging of the screen takes place, cam ridge 53 carried by the inner face of the end cap 34 bearing against the arm 51 of the indicating mechanism will rotatably move said arm about the shaft axis and since arm 51 as well as indicator hand 50 are fixed to said shaft 49, this movement is transmitted to the indicator hand. Thus the indicator hand is gradually moved from the "FILTER IS CLEAN" position to the "NEEDS CLEANING" position to indicate the cartridge needs to be cleaned or changed and eventually to the "BY-PASSING" position when by-passing is actually in progress. The boss 34 is designed to afford a relatively long or extended movement of the end cap 36 between the time the cap begins to leave the adjacent wall of the closure plate and the time it exposes the spaces between the tongues 35 to the incoming fluid to effect by-passing. There is consequently a continued and adequate signal being given to the attendant throughout this entire range of movement of the cartridge so that the precise condition of the filter screen is known at any moment of operation and long prior to actual by-passing of the screen.

As heretofore explained the indicating hand is properly set or adjusted on the shaft 49 so that it will point to the "FILTER IS CLEAN" position with the arm 51 bearing against the cam ridge 53. Whenever a clean filter cartridge is inserted into the filter housing and prior to resumption of operation of the system, the attendant should move the indicator hand to the "FILTER IS CLEAN" position on the legend plate which will bring the arm 51 firmly against the cam ridge. As the clogging of the filter cartridge progresses, the hand 50 will be moved as described. If the filter screen has become progressively clogged to the point where the cartridge has moved the hand to the "NEEDS CLEANING" position and this forewarning has gone unheeded by the attendant prior to shutting down the system, it will be noted that the hand will remain in that indicating position even though the system is idle, thus forewarning the operator prior to resumption of operation of the system that the filter is dirty and the cartridge should be changed before operation begins.

The exterior face of the closure plate 19 is provided with an integrally formed upstanding ridge or flange 64 of somewhat U-shaped configuration (see FIG. 2) which extends about the central portion of the plate and down both sides of the indicating area of the hand 50 to adequately protect the indicating hand and mechanism from accidental exterior blows that may be experienced in usual plant operations.

The entire indicating mechanism, i.e. arm 51, shaft 49, hand 50 and the legend plate, is completely carried by the closure plate and removable therewith so as to afford complete and easy access to the entire cartridge chamber 63 for removal of the cartridge and cleaning of the chamber. The indicator hand is protected by the upstanding ridge 64 so that the hand will not likely be damaged or the adjustment of the hand changed by external forces on removal of the closure plate for changing the cartridge.

A second embodiment of the invention is shown in FIG. 4 where the filter housing has been modified in certain respects to derive additional advantages not permitted in the first form of the invention. The parts of the FIG. 4 filter are precisely the same as in the FIG. 1 form except for changes in the tubular extension 128, the check plate 140 and the end cap 132.

The tubular extension 128 instead of being open at the inner end, as in the FIG. 1 form at 29, is now closed at the end 129, but the tubular walls near this end are now provided with a plurality of spaced openings 70 through which the filtered fluid from the interior of the cartridge may pass directly into the interior of the tubular extension on the way to the outlet 12 and pipe 30 to the intake of the pump. The check plate 140 is provided with a forwardly extending collar or shoe 71 which is smoothly finished on its inner surface 72 for closely fitting the cylindrical exterior surface 131 of the tubular extension but freely slidable thereon. The collar of the plate is proportioned so that the surface 72 in an axial direction of the extension is approximately one-half the width of the spaced openings 70, so that when the filter unit is in normal operation as shown in FIG. 4 approximately one-half of the width of the openings 70 will be opened to the interior of the filter cartridge to receive flow of fluid therefrom while the remaining left-hand half of the openings is securely covered by the collar 71. When the cartridge has been removed and the plate 140 has moved forward to seat against the seating face 44, the collar 72 of the plate will now completely close off the right-hand half of the openings 70 so that communication between the interior of the cartridge chamber 63 and the outlet 12 is completely blocked, while at the same time the collar has uncovered the left-hand half or portion of the openings 70, so that these openings 70, are now open to the inlet chamber 62 for the reception of the incoming fluid which will now pass directly through the tubular outlet to the pipe 30.

By virtue of the modified construction of FIG. 4 flow from the reservoir to the cartridge chamber is completely sealed off on removal of the cartridge, but at the same time the incoming fluid is permitted to go directly to the outlet by-passing, in effect, the cartridge chamber completely. This structure therefore provides means for accomplishing the same function as that obtained by the FIG. 1 form of the invention but without having to shut down the system during filter cartridge change. Uninterrupted plant operation is important in certain industries and hence the FIG. 4 modification will be found to have great utility in these environments.

In this last mentioned embodiment, end cap 132 of the cartridge assembly is adapted to bear against the check plate 140 with its inner opening seating on the upper surface of the collar 71. The forward end face of the collar is preferably beveled as at 73 to facilitate the insertion of the cartridge into proper position against the plate 140. Additionally, the outer face of the plate 140 is preferably provided with an annular flange or shoulder 74 to act as a retaining and centering means for the end of the coil spring 39 which bears against that face of the plate.

Figures 6, 7:
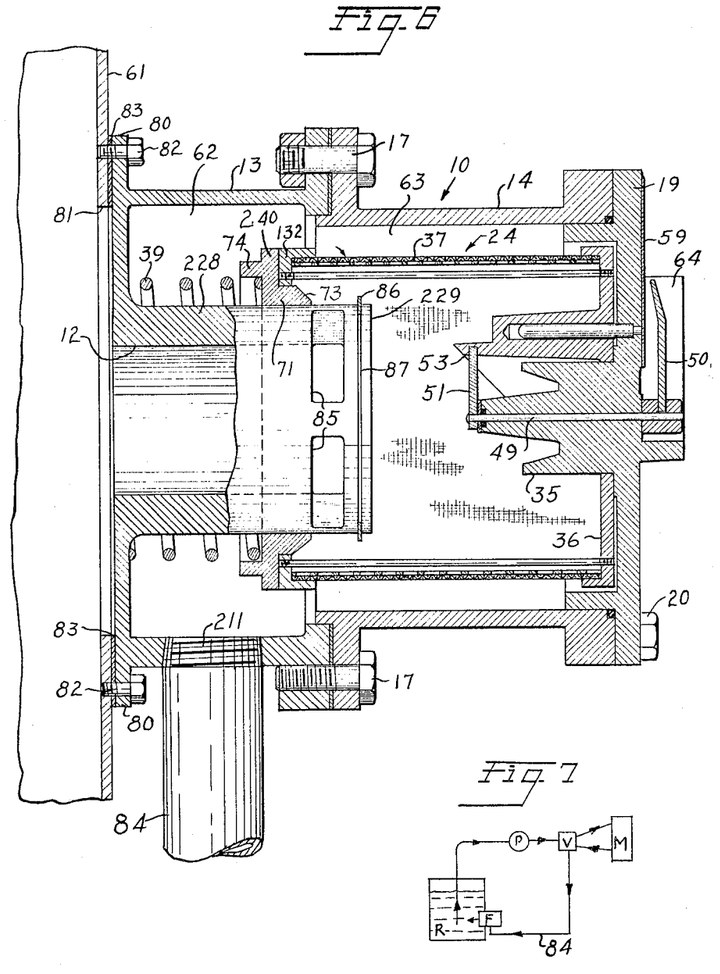
FIGURE 6 is a longitudinal sectional view through an axially movable cartridge fluid filter showing a further embodiment of the invention in a return line type of filter with the unit mounted on a fluid reservoir.
FIGURE 7 is a diagrammatic showing of a hydraulic installation in which the return line filter unit of the FIGURE 6 embodiment would be used.

A third embodiment of the invention is shown in FIG. 6 where the filter unit is modified for use as a "return line" filter but still employs the basic aspect of providing a filter structure wherein the cartridge may be changed without having to first drain the reservoir of the system.

FIG. 7 diagrammatically shows a typical hydraulic system in which a return-line filter of the submerged type is employed. Fluid is drawn through a line from the reservoir R directly to the intake of the pump P which feeds the fluid under pressure to the servo-valve V from where it is controlled in its actuation of the hydraulic motor of the system M, with the return-line from the servo-valve returning the fluid to the inlet of the filter F where the fluid is cleaned and is returned directly to the reservoir through the filter outlet for recirculation. The arrows is FIG. 7 indicate the direction of flow of fluid in the lines of the system.

The filter unit of FIG 6 is preferably mounted on the side of the reservoir wall 61 in a slightly different manner than the previous embodiments in view of its different disposition in the fluid system. The filter 10 now has its left-hand housing part 13 provided with an integral end flange 80 which is secured to the reservoir wall 61 over the opening 81 in the wall by suitable bolts 82, with sealing gaskets 83 being disposed between the abutting parts.

The right-hand housing part 14 including the closure plate and indicating mechanism is similar to the other forms of the invention, but the left-hand housing part 13, including the tubular extension 228 and the slidable plate 240 have been changed in some respects as hereinafter explained.

The inlet 211 is now internally threaded for the reception of the return line pipe 84. The wall about the inlet 211 is preferably cast somewhat thicker for strengthening the casing at this point in view of the pipe connection. The outlet 12 is now no longer threaded since the fluid discharged from the filter will now go directly to the interior of the reservoir.

Tubular extension 228 is closed at the end 229 but the tubular wall near that end is provided with a plurality of spaced openings 85 somewhat similar to the FIG. 4 embodiment although differing therefrom in that the openings are considerably narrower than the equivalent openings of that embodiment. In fact the openings 85 are only about one-half the width, in an axial direction of the tubular extension, of the openings employed in the second embodiment.

The slidable member 240 is similar to the check plate 140 of the second embodiment in that it is provided with a forwardly extending collar or shoe portion 71 having a bevelled forward nose 73 and an oppositely extending annular shoulder 74 for retaining the spring in position. While the forwardly extending shoe 71 provides a seat for the end cap 132, the slidable member 240 is of a reduced outside diameter. In fact, the outer edge of member 240 is substantially flush with the outer face of the flange of the end cap 132. In this version it is preferred that the slidable member 240 does not seat against the end face of the housing part 14 for a reason hereinafter explained. However, a snap ring 86 is mounted in a peripheral groove 87 in the tubular extension near the end 229, which ring will stop the movement of the slidable member 240 to the right when the cartridge is being changed.

The disposition of the openings 85, the snap ring 86 and the breadth of the shoe 71 is such and the parts are so designed that when the cartridge is in the housing as viewed in FIG. 6, the openings 85 are uncovered and fluid from the interior of the cartridge may pass therethrough on to the outlet 12, while when the cartridge has been removed for change or cleaning the shoe 71 will completely cover the openings 85 and prevent any access between the cartridge chamber 63 and the interior of the reservoir.

During normal operation the return fluid from the system enters the inlet 211 through pipe 84 filling the inlet chamber 62 and the cartridge chamber 63 and passes through the screen 37 to the interior of the cartridge from where it flows through the openings 85 into the tubular extension and from the outlet 12 to the reservoir.

When the filter cartridge of this form is to be changed, the pump and system are first shut down and the closure plate 19 is removed, as in the FIG. 1 modification. On removal of the closure plate and withdrawal of the cartridge, the spring 39 will urge the sliding member 240 to the right to follow the withdrawing cartridge until the forward nose of the shoe 71 contacts the snap ring 86 in which position the forward movement is arrested with the shoe portion 71 completely covering the outlet openings 85 and shutting off access between the cartridge chamber 63 and the outlet to the reservoir. The fluid head in the reservoir is therefore effectively blocked off from draining out through the cartridge chamber.

In this form (FIG. 6) the inlet 211 and the inlet chamber 62 are preferably not closed off from the cartridge chamber 63, as in the other two forms of the invention, since the inlet is not connected to the reservoir, but instead is receiving fluid under pressure from the return line 84. When the filter is being changed the pump and system are first closed down so that little fluid will actually drain out through the cartridge during actual change and such drainage that might occur is of no significance compared to the substantial head of fluid in the reservoir.

The disadvantage of the slight amount of fluid that will drain out of the casing from the inlet and inlet chamber, is greatly off-set by the safety factor in this return-line filter which is secured by not blocking off the inlet chamber from the cartridge chamber. If the slidable member 240 were formed like the other two versions to seat on the end face of the casing part 14, then a potential hazard would exist in the event an attendant inadvertently turned on the pump and system while the cartridge was out of the filter. Since the FIG. 6 form is a return line filter the line 84 is under pressure, being on the pressure side of the pump in the system. With the inlet chamber blocked and the incoming fluid under pressure the filter unit would very likely burst under pressure, with potential damage being inflicted to the system and to personnel. For this reason the inlet chamber is left open to the cartridge chamber 63 so that a potentially dangerous situation is avoided with little disadvantage in operation experienced.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

I claim:

1. A fluid filter for mounting in association with a fluid reservoir of a hydraulic system comprising a housing, two openings formed through the wall of said housing, one an inlet and the other an outlet for the fluid of the system, one of said openings adapted to be open to the fluid of said reservoir and the other opening adapted to be connected to a conduit in said system, a filter cartridge chamber in said housing, an axially movable filter cartridge mounted within said chamber, guide means carried by said housing for supporting said cartridge for axial movement in said housing whenever the pressure differential across the cartridge exceeds a predetermnied value, a valve including a fixed valve part and a movable valve part cooperating to block flow from said reservoir to said cartridge chamber whenever the cartridge is removed and a single spring means associated with said movable valve part and said cartridge for controlling both movement of said filter cartridge and for urging said valve to closed position.

2. A fluid filter as specified in claim 1 including indicating means mounted exteriorly of said housing and actuated by means extending through said housing and controlled by axial movement of said cartridge to indicate the condition of said cartridge.

3. A fluid filter as specified in claim 1 including by-pass valve means controlled by the axial movement of said cartridge and opened only after a predetermined axial movement of said cartridge for by-passing incoming fluid around said cartridge.

4. A fluid filter as specified in claim 1 including by-pass valve means controlled by the axial movement of said cartridge and opened only after a predetermined axial movement of said cartridge for by-passing incoming fluid around said cartridge and indicating means mounted exteriorly of said housing and actuated by means extending through said housing and controlled by axial movement of said cartridge to indicate the condition of said cartridge.

5. A fluid filter for fluid systems comprising a casing provided with an inlet chamber and a filter cartridge chamber, a fluid inlet leading fluid to said inlet chamber, an outlet leading from said cartridge chamber, a tubular filter cartridge mounted within said cartridge chamber so that fluid flowing from said inlet chamber will be filtered on passing through the wall of said cartridge on its way to said outlet, guide means carried by said casing for mounting said cartridge to permit an appreciable axial movement of said cartridge in said casing when the pressure differential between the outlet and the inlet exceeds a predetermined value on progressive clogging of said cartridge by filtered dirt, spring means for biasing said filter cartridge against axial movement, a valve controlling the flow of fluid between said outlet and said cartridge chamber, said valve including a movable valve element biased by said spring means toward closed position to block said flow whenever the cartridge is removed, but normally held open by said cartridge when the latter is in said cartridge chamber.

6. A fluid filter as specified in claim 5 including indicating means mounted exteriorly of said casing and actuated by means extending through said casing and controlled by axial movement of said cartridge to indicate the condition of said cartridge.

7. A fluid filter as specified in claim 5 including by-pass valve means controlled by the axial movement of said cartridge and opened only after a predetermined axial movement of said cartridge for by-passing incoming fluid around said cartridge.

8. A fluid filter as specified in claim 5 including by-pass valve means controlled by the axial movement of said cartridge and opened only after a predetermined axial movement of said cartridge for by-passing incoming fluid around said cartridge and indicating means mounted exteriorly of said casing and actuated by means extending through said casing and controlled by axial movement of said cartridge to indicate the condition of said cartridge.

9. A fluid filter for fluid systems comprising a casing provided with an inlet chamber and a filter cartridge chamber, a fluid inlet leading fluid to said inlet chamber, an outlet leading from said cartridge chamber, a tubular filter cartridge mounted within said cartridge chamber so that fluid flowing from said inlet chamber will be filtered on passing through the wall of said cartridge on its way to said outlet, guide means carried by said casing for mounting said cartridge to permit an appreciable axial movement of said cartridge in said casing when the pressure differential between the outlet and the inlet exceeds a predetermined value on progressive clogging of said cartridge by filtered dirt, spring means for biasing said filter cartridge against axial movement, a valve controlling the flow of fluid between said inlet chamber and said cartridge chamber, said valve including a movable valve element biased by said spring means toward closed position to block said flow whenever the cartridge is removed, but normally held open by said cartridge when the latter is in said cartridge chamber.

10. A fluid filter as specified in claim 9 including a second valve associated with said guide means and controlled by said movable valve element for controlling flow from said cartridge chamber to said outlet and also normally held open by said cartridge and biased by said spring means to closed when said cartridge is removed.

11. A fluid filter as specified in claim 10 wherein said second valve also opens flow directly from said inlet chamber to said outlet on removal of said cartridge.

12. A fluid filter as specified in claim 9 including indicating means mounted exteriorly of said casing and actuated by means extending through said casing and controlled by axial movement of said cartridge to indicate the condition of said cartridge.

13. A fluid filter as specified in claim 9 including by-pass valve means controlled by the axial movement of said cartridge and opened only after a predetermined axial movement of said cartridge for by-passing incoming fluid around said cartridge.

14. A fluid filter as specified in claim 9 including by-pass valve means controlled by the axial movement of said cartridge and opened only after a predetermined axial movement of said cartridge for by-passing incoming fluid around said cartridge and indicating means mounted exteriorly of said casing and actuated by means extending through said casing and controlled by axial movement of said cartridge to indicate the condition of said cartridge.

15. A fluid filter of the axially movable cartridge type comprising a housing provided with an inlet chamber and a filter cartridge chamber, an axially disposed tubular outlet extension formed at one end of said housing and extending through the inlet chamber into one end of the cartridge chamber and provided with an opening at its inner end, a closure plate closing the other end of said housing, an inwardly extending boss carried by said closure plate and axially disposed with reference to said tubular extension and of less external diameter than said extension, a filter cartridge comprising a tubular filter element and end caps affixed thereto positioned within said cartridge chamber with one end can slidingly disposed about said tubular extension and the other end cap slidingly disposed about said boss, spring means biasing said cartridge against said closure plate and a valve element slidably disposed on said tubular extension between said one end cap and said spring means, said valve element movable along said extension under the influence of said spring means to block flow of fluid between said filter cartridge chamber and said tubular outlet through said opening whenever the cartridge is removed from said cartridge chamber but normally held by said cartridge in a position to permit said flow when the cartridge is in place.

16. A fluid filter as specified in claim 15 wherein said valve element includes means for connecting said inlet chamber directly with said tubular outlet whenever the cartridge is removed from the cartridge chamber.

17. A fluid filter as specified in claim 15 including stop means to arrest forward movement of said valve element under the influence of said spring means whenever the cartridge is removed.

18. A fluid filter as specified in claim 15 wherein the movement of said valve element to block flow of fluid between said filter cartridge chamber and said tubular outlet when the cartridge is removed does not interfere with the normal passage of fluid between said inlet chamber and said cartridge chamber.

19. A fluid filter as specified in claim 15 wherein said closure plate includes means cooperating with a wall of said cartridge chamber to permit said valve element to close before the closure plate is completely removed from said housing.

20. A fluid filter of the axially movable cartridge type comprising a housing provided with an inlet chamber and a filter cartridge chamber, an axially disposed tubular outlet extension formed at one end of said housing and extending through the inlet chamber into one of the cartridge chamber and provided with an opening at its inner end, a closure plate closing the other end of said housing, an inwardly extending boss carried by said closure plate and axially disposed with reference to said tubular extension and of less external diameter than said extension, a filter cartridge comprising a tubular filter element and end caps affixed thereto positioned within said cartridge chamber with one end cap slidingly disposed about said tubular extension and the other end cap slidingly disposed about said boss, spring means biasing said cartridge against said closure plate and a valve seat disposed between said inlet and cartridge chambers, a valve plate slidably disposed on said tubular extension between said one end cap and said spring means and normally urged by said spring means toward said valve seat to block flow of fluid from said inlet chamber to said filter cartridge chamber, said filter cartridge being of an overall length sufficient to hold said valve plate away from said valve seat when said cartridge is disposed within said housing.

21. A fluid filter as specified in claim 20 wherein said valve plate includes means for closing said opening in the inner end of said tubular outlet extension whenever said valve plate seats on said valve seat.

22. A fluid filter as specified in claim 20 wherein said valve plate includes means for closing said opening in the inner end of said tubular outlet extension to said cartridge chamber and uncovering said opening to said inlet chamber whenever said valve plate seats on said valve seat.

23. A fluid filter for fluid systems comprising a casing provided with an inlet chamber and a filter cartridge chamber, a fluid inlet leading fluid to said inlet chamber, an outlet leading from said cartridge chamber, a tubular filter cartridge mounted within said cartridge chamber so that fluid flowing from said inlet chamber will be filtered on passing through the wall of said cartridge on its way to said outlet, guide means carried by said casing for mounting said cartridge to permit an appreciable axial movement of said cartridge in said casing when the pressure differential between the outlet and the inlet exceeds a predetermined value on progressive clogging of said cartridge by filtered dirt, spring means for biasing said filter cartridge against axial movement, a main passage for fluid from said inlet through said filter cartridge to said outlet, a second passage for said fluid from said inlet to said outlet, a single valve means controlling the flow of fluid through both passages, said valve means including a movable valve element biased by said spring means to a position to block flow through the main passage and to open flow to the second passage whenever the cartridge is removed, but normally held away from said position by said cartridge when the latter is in said cartridge chamber with the main passage open and the second passage closed.

24. A fluid filter for fluid systems comprising a casing provided with an inlet chamber and a filter cartridge chamber, a fluid inlet leading fluid to said inlet chamber, an outlet leading from said cartridge chamber, a filter cartridge including end caps mounted within said cartridge chamber so that fluid flowing from said inlet chamber will be filtered on passing through the wall of said cartridge on its way to said outlet, a closure plate for affording access to said cartridge chamber, guide means carried by said casing for mounting said cartridge to permit an appreciable axial movement of said cartridge in said casing when the pressure differential between the outlet and the inlet exceeds a predetermined value on progressive clogging of said cartridge by filtered dirt, spring means for biasing said filter cartridge against axial movement, cam means carried by the inner face of one of said end caps, indicating means completely carried by said closure plate and removable therewith for indicating movement of the cartridge and the condition thereof, said indicating means comprising a rotary indicator mounted on the outer face of said closure plate and fixed to a shaft journaled in and extending through said plate axially of the direction of movement of said cartridge, an actuating arm fixed to the inner end of said shaft and positioned adjacent to said cam means and movable thereby upon movement of said filter cartridge to rotate said shaft.

25. A fluid filter as specified in claim 24 wherein said rotary indicator is protected from external forces by an outstanding flange carried by the outer face of said closure plate.

26. A fluid filter assembly of the axially movable cartridge type comprising a housing provided with an inlet chamber and a filter cartridge chamber, an axially disposed tubular outlet extension formed at one end of said housing and extending inwardly therefrom through said inlet chamber into one end of said cartridge chamber, said extension being provided with an opening at its inner end for the reception of filtered fluid, a closure plate closing the other end of said housing, an inwardly extending boss carried by said closure plate and axially disposed with reference to said tubular outlet extension and of less external diameter than said extension, a filter cartridge comprising a hollow filter element and end caps affixed thereto positioned within said cartridge chamber for axial movement therein with one end cap slidingly disposed about said tubular extension with said opening disposed within said cartridge and the other end cap slidingly disposed about said boss, spring biasing means for holding said cartridge against axial movement and against said closure plate, an inwardly extending cam means carried on the inner face of said other end cap and disposed within said cartridge, indicating means completely carried by said closure plate for indicating movement of said cartridge away from said closure plate to convey the condition thereof, said indicating means comprising a rotatably mounted indicating hand mounted on the external face of said closure plate and carried by a shaft journaled in and extending through said plate and boss axially of the direction of movement of said cartridge, an actuating arm fixed to the inner end of said shaft and positioned adjacent to said cam means and adapted to be engaged and moved by said cam means upon movement of said filter cartridge to rotate said shaft and suitable indicia carried by said closure plate and correlated with respect to said rotatable indicator hand.

27. A fluid filter as described in claim 26 and means to position and retain the filter cartridge and the closure plate in proper relative position so that the indicating mechanism and the cam means will always be properly oriented with respect to each other.

References Cited by the Examiner
UNITED STATES PATENTS

| 2,503,566 | 4/1950 | Scott | 210—172 |
| 2,524,336 | 10/1950 | Vokes | 210—131 |
| 2,544,244 | 3/1951 | Vokes | 210—234 |
| 3,040,894 | 6/1962 | Pall | 210—235 |
| 3,056,379 | 10/1962 | Thomas | 210—90 X |
| 3,076,336 | 2/1963 | Rosaen et al. | 73—198 |

REUBEN FRIEDMAN, *Primary Examiner.*

HERBERT L. MARTIN, *Examiner.*

J. DECESARE, C. R. REAP, *Assistant Examiners.*